(12) United States Patent
Lee

(10) Patent No.: US 10,236,780 B2
(45) Date of Patent: Mar. 19, 2019

(54) CONVERTER

(71) Applicant: DELTA ELECTRONICS, INC., Taoyuan (TW)

(72) Inventor: Wen-Chang Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/716,495

(22) Filed: Sep. 26, 2017

(65) Prior Publication Data
US 2018/0301997 A1 Oct. 18, 2018

(30) Foreign Application Priority Data
Apr. 14, 2017 (CN) .......................... 2017 1 0244194

(51) Int. Cl.
*H02M 3/335* (2006.01)
*H02M 7/48* (2007.01)

(52) U.S. Cl.
CPC ... *H02M 3/33523* (2013.01); *H02M 3/33507* (2013.01); *H02M 3/33546* (2013.01); *H02M 3/33553* (2013.01); *H02M 2007/4815* (2013.01)

(58) Field of Classification Search
CPC ..... H02M 2007/4815; H02M 3/33507; H02M 3/33523; H02M 3/33546; H02M 3/33553
See application file for complete search history.

(56) References Cited

U.S. PATENT DOCUMENTS 5,373,432 A  12/1994 Vollin et al.
9,762,115 B2 * 9/2017 Sharma .................. H02M 1/10
9,787,205 B2 * 10/2017 Kobayashi ........ H02M 3/33569
2002/0054498 A1 * 5/2002 Cho .................... H02M 3/3376
                                                                363/132
2007/0236967 A1 * 10/2007 Liu ..................... H02M 1/4241
                                                                363/21.02
2011/0248812 A1  10/2011 Hu et al.
2014/0185330 A1 * 7/2014 Huang ................ H02M 3/3376
                                                                363/21.02

(Continued)

FOREIGN PATENT DOCUMENTS

CN          105991036 A    10/2016
EP          0601858 A1     6/1994
(Continued)

OTHER PUBLICATIONS

The pertinent parts of US2011248812A1.
The pertinent parts of US20170140868A1.

*Primary Examiner* — Kyle J Moody
(74) *Attorney, Agent, or Firm* — CKC & Partners Co., LLC

(57) ABSTRACT

A converter includes a switching circuit, a resonant circuit, a rectifying circuit, and a transformer including a primary winding, and a secondary winding. The switching circuit is configured to convert a DC input voltage to a switching signal. The resonant circuit is electrically coupled to the switching circuit and configured to receive the switching signal to provide a primary current. The primary winding is coupled to the resonant circuit. The rectifying circuit is coupled to the secondary winding and configured to rectify a secondary current outputted by the secondary winding so as to provide an output voltage. The resonant circuit includes a variable inductor to adjust the characteristic curve of the converter.

14 Claims, 10 Drawing Sheets

(56) References Cited

U.S. PATENT DOCUMENTS

| | | | |
|---|---|---|---|
| 2015/0115911 A1* | 4/2015 | Parto | H02M 3/158 |
| | | | 323/271 |
| 2016/0079866 A1* | 3/2016 | Mizushima | H02M 3/3376 |
| | | | 363/17 |
| 2016/0149495 A1 | 5/2016 | Berke et al. | |
| 2016/0172982 A1* | 6/2016 | Yamaoka | H01F 21/00 |
| | | | 363/21.03 |
| 2017/0140868 A1 | 5/2017 | Kim | |

FOREIGN PATENT DOCUMENTS

| | | |
|---|---|---|
| TW | 201417476 A | 5/2014 |
| WO | 2016003190 A1 | 1/2016 |

\* cited by examiner

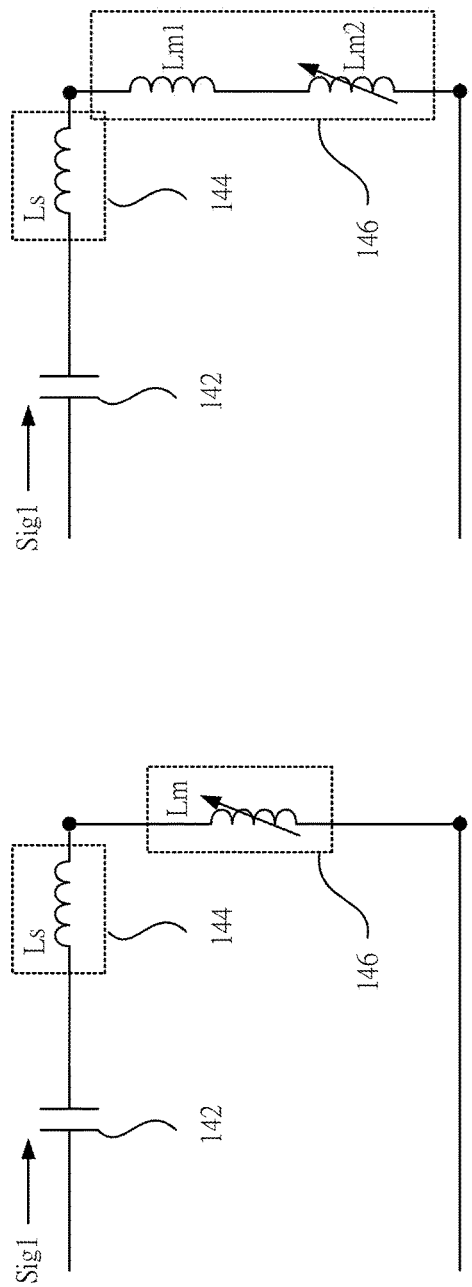

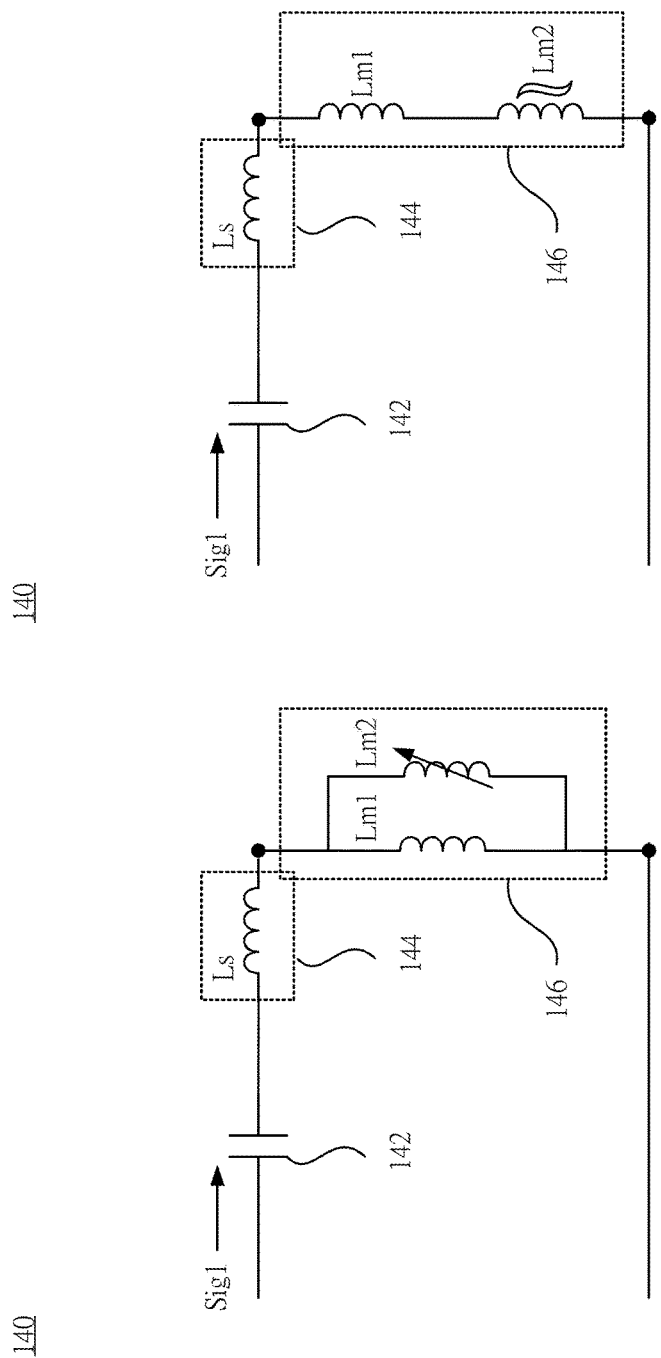

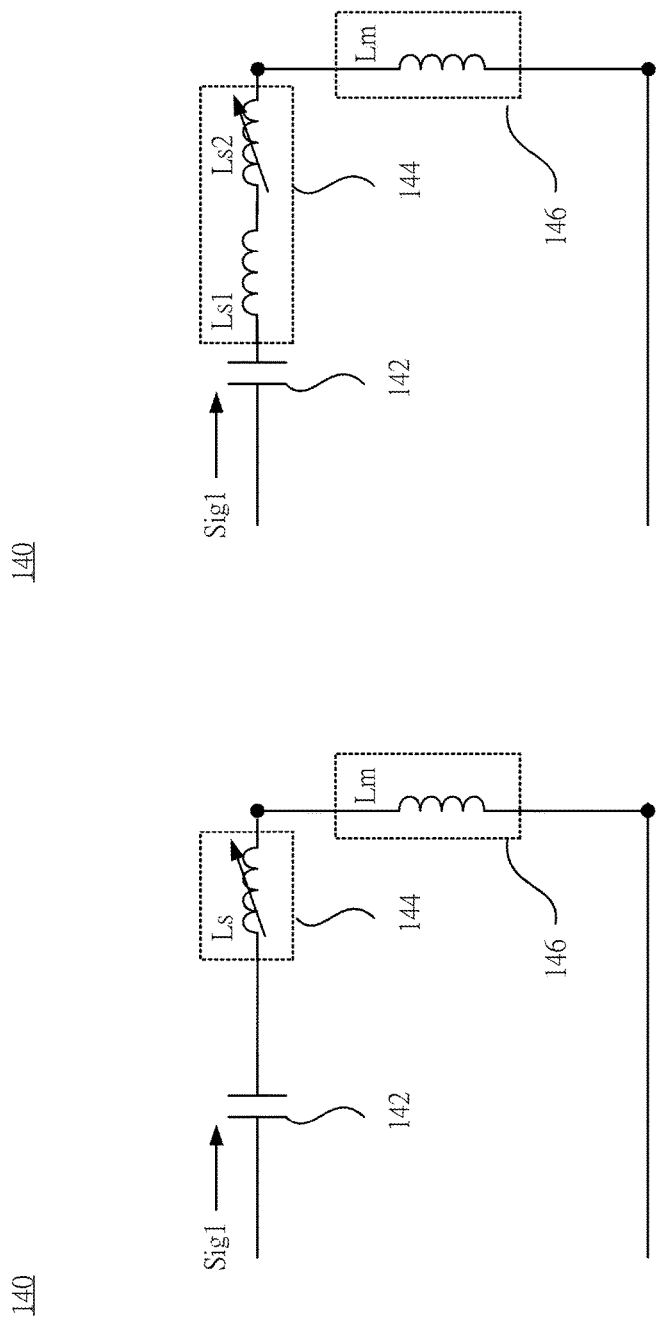

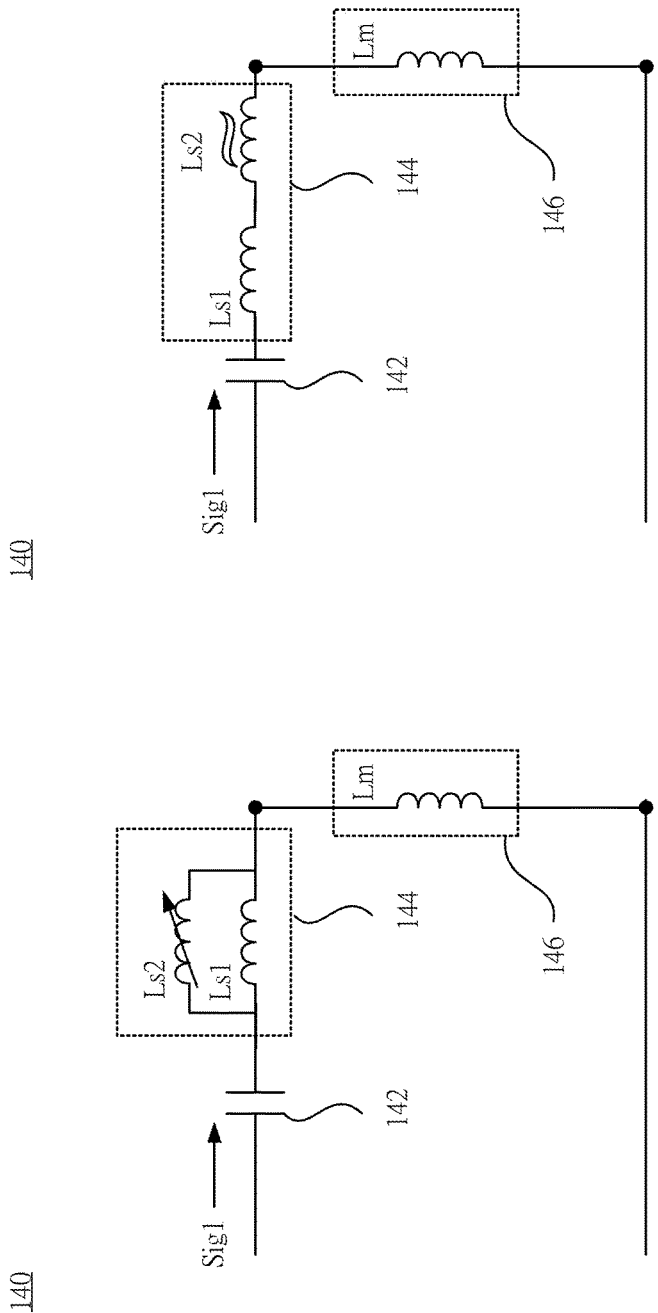

CONVERTER

RELATED APPLICATIONS

This application claims priority to China Application Serial Number 201710244194.3, filed Apr. 14, 2017, which is herein incorporated by reference.

BACKGROUND

Technical Field

The present disclosure relates to a converter, and in particular, to a resonant converter.

Description of Related Art

A LLC resonant converter may provide a stable output voltage by frequency modulation. Since an LLC resonant converter is suitable for a wide range of input voltages and is capable of large power output, the LLC resonant converter has been widely applied in various applications.

However, in the situation which the load condition and the operating condition may change, the LLC converter then suffers low efficiency and the application thereof is limited since the converter cannot operate at the LLC converter's best operation point if the ratio of the magnetic inductance and the resonant inductance is too large or too small.

SUMMARY

One aspect of the present disclosure is a converter. The converter includes a switching circuit, a resonant circuit, a transformer, and a rectifying circuit. The switching circuit is configured to convert a dc input voltage to a switching signal. The resonant circuit is electrically coupled to the switching circuit and configured to receive the switching signal to provide a primary current. The transformer includes a primary winding electrically coupled to the resonant circuit, and a secondary winding. The rectifying circuit is electrically coupled to the secondary winding and configured to rectify a secondary current outputted by the secondary winding so as to provide an output voltage. The resonant circuit includes a variable inductor to adjust a characteristic curve of the converter.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 5A-FIG. 5D are diagrams illustrating the resonant circuit according to some embodiments of the present disclosure.

FIG. 6A-FIG. 6D are diagrams illustrating the resonant circuit according to some other embodiments of the present disclosure.

DETAILED DESCRIPTION

Figure 1:
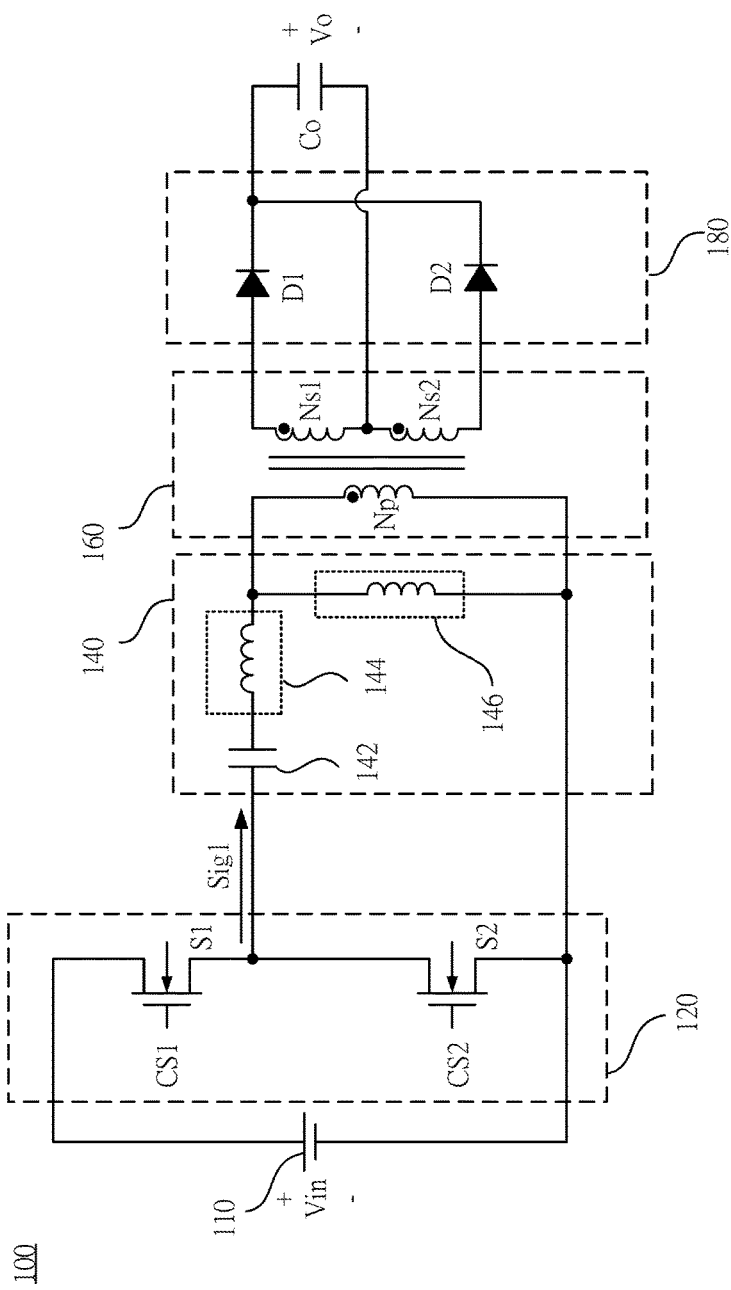
FIG. 1 is a diagram illustrating a converter according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a converter 100 according to some embodiments of the present disclosure. As shown in FIG. 1, in some embodiments, the converter 100 includes a switching circuit 120, a resonant circuit 140, a transformer 160, a rectifying circuit 180 and an output capacitor Co.

An input terminal of the switching circuit 120 is electrically coupled to a DC voltage source 110 and configured to receive a DC input voltage Vin. An output terminal of the switching circuit 120 is electrically coupled to an input terminal of the resonant circuit 140, and configured to output a switching signal Sig1 to the resonant circuit 140, in which the switching signal Sig1 is converted from the DC input voltage Vin by the switching circuit 120. An output terminal of the resonant circuit 140 is electrically coupled to a primary side of the transformer 160. An input terminal of the rectifying circuit 180 is electrically coupled to secondary side of the transformer 160. An output terminal of the rectifying circuit 180 is electrically coupled to the output capacitor Co to provide a DC output voltage Vo to a post-stage circuit. Thus, the switching circuit 120, the resonant circuit 140, the transformer 160 and the rectifying circuit 180 may form a LLC resonant converter circuit structure.

Specifically, in some embodiments, the primary side of the transformer 160 includes a primary winding Np, and the secondary side of the transformer 160 includes two secondary windings Ns1, Ns2, in which a start point of the secondary winding Ns2 is electrically coupled to an end point of the secondary winding Ns1, and electrically coupled to a negative terminal of the output capacitor Co together. For example, in some embodiments, the transformer 160 may be a secondary side center tapped transformer such that the secondary side of the transformer 160 is divided to the secondary winding Ns1 and the secondary winding Ns2 electrically coupled to each other. In some embodiments, the transformer 160 may also be the transformer with one secondary winding at the secondary side, and accompanied with the full bridge rectifying circuit. The secondary side and the rectifying circuit of which may be completed based on various forms known by one skilled in the art.

In some embodiments, the switching circuit 120 in the converter 100 may apply a half-bridge structure to construct the half-bridge resonant converter, but the present disclosure is not limited thereto. As shown in FIG. 1, in some embodiments, the switching circuit 120 includes switches S1 and S2. A first terminal of the switch S1 is electrically coupled to the positive terminal of the DC input voltage Vin, and a second terminal of the switch S1 is electrically coupled to the resonant circuit 140. A first terminal of the switch S2 is electrically coupled to the second terminal of the switch S1, and a second terminal of the switch S2 is electrically coupled to the negative terminal of the DC input voltage Vin. Control terminals of the switches S1 and S2 are respectively configured to receive driving signals CS1, CS2, such that the switches S1 and S2 are turned ON or OFF selectively, according to the driving signals CS1 and CS2 respectively.

Thus, the switching circuit 120 may, by turning ON one of the switches S1, S2 selectively, output the switching signal Sig1 with high level (e.g., input voltage Vin) on the condition that the switch S1 is ON, and output the switching signal Sig1 with low level (e.g., zero voltage) on the condition that the switch S2 is ON. For example, in a complete switching cycle, the driving signals CS1, CS2 may be pulse frequency modulation signals, and the switches S1 and S2 may be respectively turned ON in the first half cycle and the second half cycle, in order to output the switching signal Sig1 with 50% duty cycle. In some embodiments, the DC output voltage Vo is detected and sampled, and thus a sensing signal may be fed back accordingly from the secondary side to the primary side through an isolation circuit, in order to determine the switching frequency of the driving signals CS1, CS2. In addition, in other embodiments, the switching circuit 120 may also include four switches of two pairs, the switches respectively receive corresponding driving signals to be ON or OFF selectively. Thus, in a complete cycle, the switching circuit 120 may turn ON one pair of switches according to the driving signals in the first half cycle, and turn OFF the other pair of switches according to the driving signals in order to output the switching signal Sig1 with positive level, and in the second half cycle, the switching circuit 120 switches ON and OFF of the switches according to the driving signals to output the switching signal Sig1 with negative level.

In some embodiments, the resonant circuit 140 includes a resonant capacitance unit 142, a resonant inductance unit 144 and a magnetic inductance unit 146, but the present disclosure is not limited thereto. The resonant capacitance unit 142 and the resonant inductance unit 144 are electrically coupled to the primary winding Np in series. The magnetic inductance unit 146 is electrically coupled to the primary winding Np in parallel. For example, as shown in FIG. 1, a first terminal of the resonant capacitance unit 142 is electrically coupled to a first terminal of the resonant circuit 140, so as to be electrically coupled to the second terminal of the switch S1 and the first terminal of the switch S2. A second terminal of the resonant capacitance unit 142 is electrically coupled to a first terminal of the resonant inductance unit 144. A second terminal of the resonant inductance unit 144 is electrically coupled to a first terminal of the magnetic inductance unit 146. A second terminal of the magnetic inductance unit 146 is electrically coupled to a second terminal of the resonant circuit 140, so as to be electrically coupled to the negative terminal of the DC input voltage Vin, but the present disclosure is not limited thereto. In some embodiments, the resonant inductance unit 144 and the magnetic inductance unit 146 may respectively include the leakage inductance and the magnetizing inductance of the transformer 160. In some other embodiments, the resonant capacitance unit 142, the resonant inductance unit 144 and the magnetic inductance unit 146 may also be electrically coupled in various way to construct the LLC resonant circuit. In addition, in some other embodiments, the resonant circuit 140 may also construct a LC resonant circuit, a LCC resonant circuit, a LLCC resonant circuit with one or more sets of inductance units and capacitance units, and thus the LLC resonant circuit illustrated in the figures of the present disclosure is merely an example and not meant to limit the present disclosure. Alternatively stated, a person having ordinary skill in the art can realize that the resonant circuit 140 in various embodiments of the present disclosure may be any possible combination of one or more inductance units and one or more sets of capacitance units, which are electrically coupled in various ways, such as in series or in parallel, to implement resonance.

Specifically, any one of the resonant inductance unit 144 and the magnetic inductance unit 146 includes a variable inductor, and the resonant circuit 140 is configured to adjust the inductance ratio between the magnetic inductance unit 146 and the resonant inductance unit 144 by the variable inductor, so as to adjust the characteristic curve of the converter 100. The detail will be discussed in the following paragraphs in accompany with corresponding drawings.

As shown in FIG. 1, in some embodiments, the rectifying circuit 180 is electrically coupled to the secondary winding Ns1 and the secondary winding Ns2 of the transformer 160, and configured to rectify a secondary current Is outputted from the secondary winding Ns1 and the secondary winding Ns2 and induced by the change of the signal at the primary winding Np, in order to provide an output voltage Vo between two terminals of the output capacitor Co.

In some embodiments, the rectifying circuit 180 includes diodes D1 and D2. An anode of the diode D1 is electrically coupled to a start point of the secondary winding Ns1. A cathode of the diode D1 is electrically coupled to a positive terminal of the output capacitor Co. An anode of the diode D2 is electrically coupled to an end point of the secondary winding Ns2. A cathode of the diode D2 is electrically coupled to the cathode of the diode D1.

Thus, by the rectifying circuit 180 and the output capacitor Co performing rectification and filtering to the electrical signal induced and outputted by the secondary windings Ns1, Ns2, the DC output voltage Vo may be provided.

Therefore, by the operation of the circuits mentioned above, the converter 100 may convert the DC input voltage Vin to the DC output voltage Vo with proper voltage level to post-stage circuits.

Figure 2:
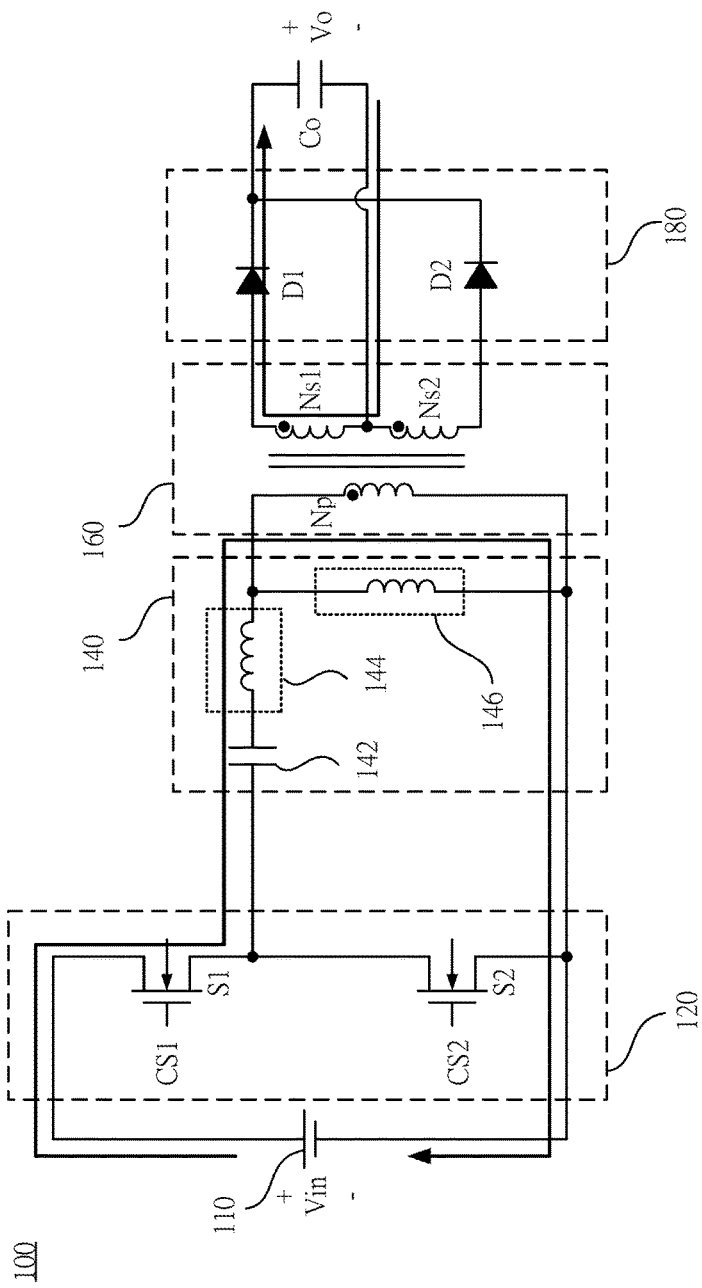
FIG. 2 and FIG. 3 are diagrams illustrating the operation of the converter according to some embodiments of the present disclosure.
Figure 3:
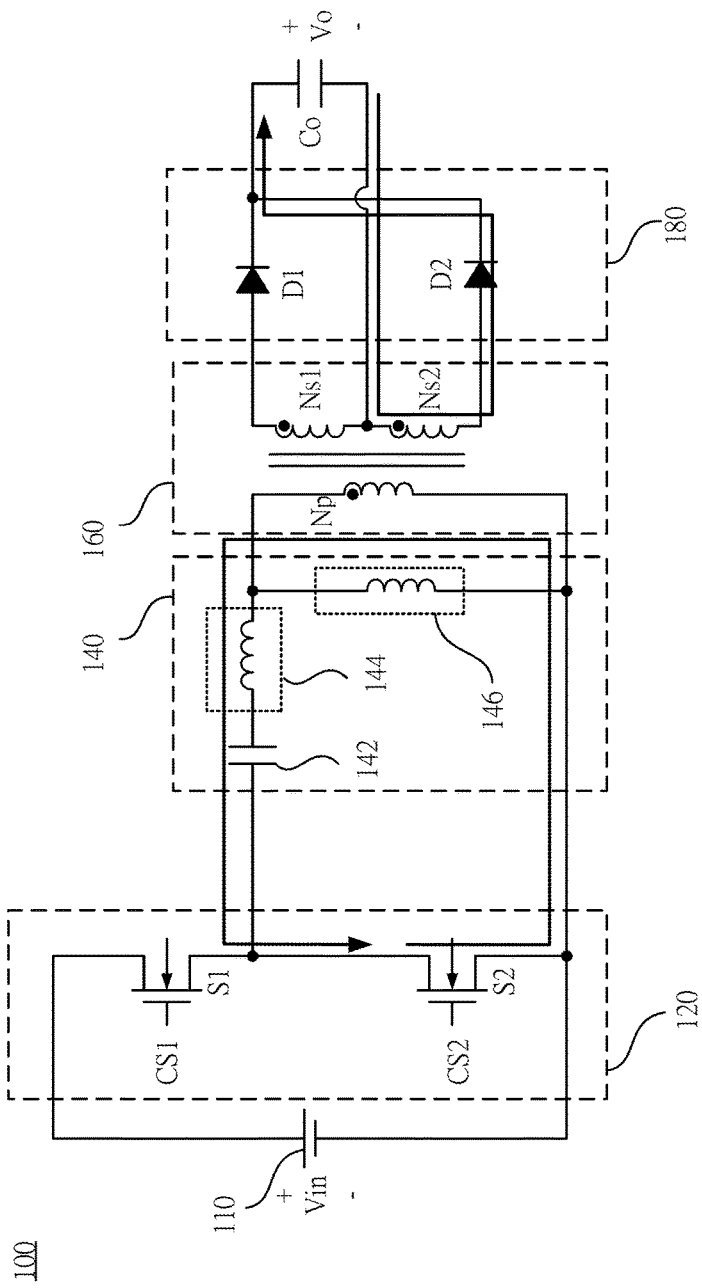

Reference is made to FIG. 2 and FIG. 3. FIG. 2 and FIG. 3 are diagrams illustrating the operation of the converter 100 according to some embodiments of the present disclosure. With respect to the embodiments of FIG. 1, like elements in FIG. 2 and FIG. 3 are designated with the same reference numbers for ease of understanding. The specific operations of similar elements, which are already discussed in detail in above paragraphs, are omitted herein for the sake of brevity, unless there is a need to introduce.

As shown in FIG. 2, in the first half cycle, the switch S1 receives the driving signal CS1 with an enable level and is turned ON. The primary winding handles a positive voltage, and the resonant capacitance unit 142 and the resonant inductance unit 144 participate in the resonance, and the energy is transmitted to the secondary winding Ns1 via the transformer 160, and thereafter the current is outputted via the conducting diode D1.

As shown in FIG. 3, in the second half cycle, the switch S2 receives the driving signal CS2 with the enable level and is turned ON. As the switching signal Sig1 drops to zero, the primary winding handles a reversed voltage, and the resonant capacitance unit 142 and the resonant inductance unit 144 participate in the resonance, and the energy is transmitted to the secondary winding Ns2 via the transformer 160, and thereafter the current is outputted via the conducting diode D2.

For the circuit structure of the LLC resonant converter shown in FIG. 1-FIG. 3, the resonant frequency, quality factor, and DC gain of the converter 100 may be represented by the following equations respectively.

$$f_s = \frac{1}{2 \cdot \pi \cdot \sqrt{L_s \cdot C_s}}$$

$$Q = \frac{\sqrt{L_s/C_s}}{\frac{8}{\pi^2} \cdot n^2 \cdot R_o}$$

$$M(h, Q, \Omega) = \frac{n \cdot V_o}{V_{in}/2} \cong \frac{1}{\sqrt{\left(1 + \frac{1}{h} - \frac{1}{\Omega^2 \cdot h}\right)^2 + Q^2 \cdot \left[\Omega - \frac{1}{\Omega}\right]^2}}$$

$f_s$ denotes resonant frequency. $L_s$ denotes the inductance value of the resonant inductance unit 144. $C_s$ denotes the capacitance value of the resonant capacitance unit 142. n denotes the winding ratio between the primary winding Np and the secondary windings Ns1, Ns2. $R_o$ denotes the resistance value of the load. $M(h, Q, \Omega)$ denotes the DC gain. h denotes the ratio of the inductance value between the magnetic inductance unit 146 and the resonant inductance unit 144 (i.e., $L_m/L_s$). $\Omega$ denotes the normalized frequency (i.e., the ratio $f/f_s$ between the switching frequency f and the resonant frequency $f_s$).

Based on the above equations, it can be obtained that the resonant frequency $f_s$ and the quality factor Q are related to the inductance value $L_s$ of the resonant inductance unit 144.

The greater the inductance value $L_s$ of the resonant inductance unit 144 is, the greater the quality factor Q is, and the lower the resonant frequency $f_s$ is. On the other hand, the less the inductance value $L_s$ of the resonant inductance unit 144 is, the less the quality factor Q is, and the higher the resonant frequency $f_s$ is.

In addition, the DC gain $M(h,Q,\Omega)$ of the converter 100 can be presented as a function of the ratio of the inductance value h, the quality factor Q, and the normalized frequency $\Omega$. Therefore, the DC gain $M(h, Q, \Omega)$ of the converter 100 is related to the inductance value $L_s$ of the resonant inductance unit 144 and the inductance value $L_m$ of the magnetic inductance unit 146.

During the operation, the switching frequency f of the resonant converter is usually designed to be around the resonant frequency $f_s$ to obtain better conversion efficiency and keep the overall operation range of the switching frequency f within a certain region, such that the loss of the converter 100 is kept at a low level under various operating conditions. Therefore, by arranging the inductance value $L_s$ of the resonant inductance unit 144 and the inductance value $L_m$ to be changeable in the operation of the circuit, the value h, the quality factor Q, and the resonant frequency $f_s$ may be adjusted to enhance the operation characteristic of the converter 100, such that a desired operating point may be obtained on the characteristic curve.

Figure 4A:
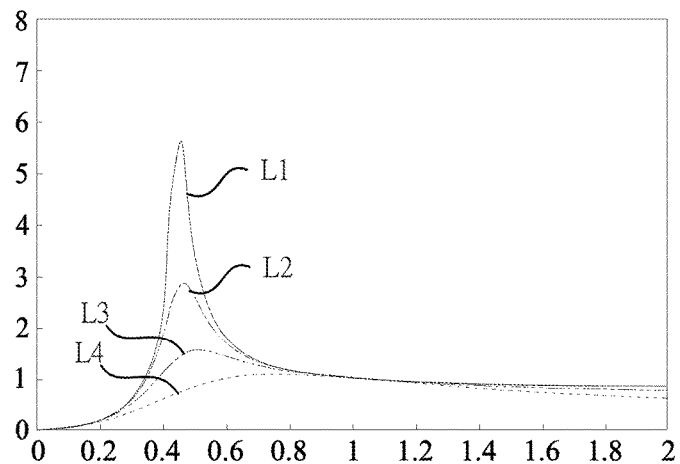
FIG. 4A-FIG. 4C are diagrams illustrating the relationship of the DC gain and the normalized frequency according to some embodiments of the present disclosure.
Figure 4B:
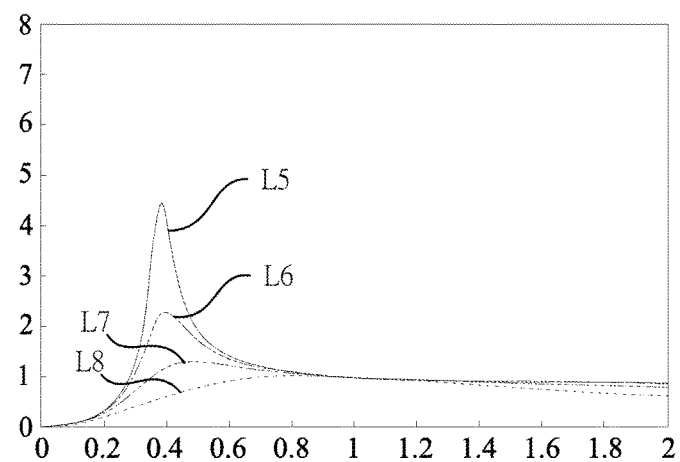
Figure 4C:
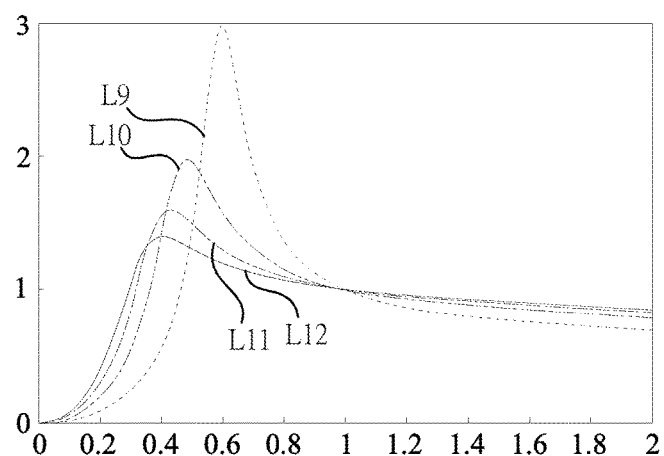

Reference is made to FIG. 4A, FIG. 4B and FIG. 4C. FIG. 4A, FIG. 4B and FIG. 4C are diagrams illustrating the relationship of the DC gain $M(h, Q, \Omega)$ and the normalized frequency $\Omega$ according to some embodiments of the present disclosure. In FIG. 4A, FIG. 4B and FIG. 4C, the horizontal axis denotes the normalized frequency $\Omega$, and the vertical axis denotes the DC gain $M(h, Q, \Omega)$. In FIG. 4A, curves L1, L2, L3 and L4 respectively represent the relationship of the DC gain $M(h, Q, \Omega)$ and the normalized frequency $\Omega$ on the condition that the quality factor Q is 0.1, 0.2, 0.4, and 0.8, in which the inductance value ratio h of the magnetic inductance unit 146 and the resonant inductance unit 144 is fixed at 4. In FIG. 4B, curves L5, L6, L7 and L8 respectively represent the relationship of the DC gain $M(h, Q, \Omega)$ and the normalized frequency $\Omega$ on the condition that the quality factor Q is 0.1, 0.2, 0.4, and 0.8, in which the inductance value ratio h of the magnetic inductance unit 146 and the resonant inductance unit 144 is fixed at 6. In FIG. 4C, curves L9, L10, L11 and L12 respectively represent the relationship of the DC gain $M(h, Q, \Omega)$ and the normalized frequency $\Omega$ on the condition that the inductance value ratio h is 2, 4, 6, and 8, in which the quality factor Q is fixed at 0.3.

It is noted that, the specific parameter values and the characteristic curves depicted in FIG. 4A, FIG. 4B and FIG. 4C are merely by examples in order to explain the correlation between the DC gain $M(h, Q, \Omega)$, the inductance value ratio h, the quality factor Q and the normalized frequency $\Omega$, and not meant to limit the present disclosure.

As shown in FIG. 4A and FIG. 4B, on the condition that the inductance value ratio h of the magnetic inductance unit 146 and the resonant inductance unit 144 is a large ratio value, for the curves with the same quality factor Q (e.g., with the same load condition), the converter 100 has a small maximum DC gain value. For example, on the condition that the quality factor is maintained at 0.1, if the inductance value ratio h is 4, the maximum value of the curve is greater than 5. On the other hand, if the inductance value ratio h is 6, the maximum value of the curve is between 4 and 5.

In addition, on the condition that the inductance value ratio h of the magnetic inductance unit 146 and the resonant inductance unit 144 is a large ratio value, the normalized frequency Ω corresponding to the maximum DC gain is low. On the other hand, on the condition that the inductance value ratio h of the magnetic inductance unit 146 and the resonant inductance unit 144 is a small ratio value, the normalized frequency Ω corresponding to the maximum DC gain is high. Alternatively stated, on the condition that the inductance value ratio h of the magnetic inductance unit 146 and the resonant inductance unit 144 is a large ratio value, the switching frequency f is away from the resonant frequency $f_s$ of the converter 100 so as to operate at the same DC gain output, which affects the overall efficiency of the converter 100.

Furthermore, it can also be obtained in FIG. 4A and FIG. 4B that within the operating region of which the switching frequency f is lower than the resonant frequency $f_s$, if the converter 100 operates at the same switching frequency f, on the condition that the inductance value ratio h of the magnetic inductance unit 146 and the resonant inductance unit 144 is large, the converter 100 has the small DC gain M(h, Q, Ω).

It can also be obtained in FIG. 4C that if the quality factor Q is kept at a constant value, and the inductance value ratio h of the magnetic inductance unit 146 and the resonant inductance unit 144 changes, for a large inductance value ratio h, the maximum value of the DC gain is small, and the change of the DC gain M(h, Q, Ω) is smooth when the normalized frequency Ω increases as the switching frequency f increases. Thus, under a light load condition, the output voltage Vo may not be controlled at a proper voltage level.

However, for a small h value, the magnetic inductance unit 146 is relatively small, which results in a large magnetic current and thus the switching loss of the switch is increased. Therefore, the selection of the h value may not satisfy every operating condition. Alternatively stated, according to the characteristic curves depicted in FIG. 4A, FIG. 4B and FIG. 4C, if the inductance value of the resonant inductance unit 144 and the magnetic inductance unit 146 are both constant, the characteristic curve cannot be adjusted based on the different load condition and operating condition, which causes the low efficiency of the converter 100, and the application is also limited.

Therefore, in some embodiments of the present disclosure, one of the resonant inductance unit 144 and the magnetic inductance unit 146 includes at least one variable inductor. Accordingly, the resonant circuit 140 may be configured to adjust the inductance value ratio h of the resonant inductance unit 144 and the magnetic inductance unit 146 by the variable inductor. Thus, the converter 100 may control the maximum DC gain of the converter 100 by adjusting the inductance value of the variable inductor.

In addition, in the embodiments that the resonant inductance unit 144 includes the variable inductor, the resonant circuit 140 may further be configured to adjust the quality factor Q of the converter 100 and the inductance value ratio h of the resonant inductance unit 144 and the magnetic inductance unit 146 by the variable inductor at the same time, so as to adjust the output characteristic of the converter 100.

For example, in applications of which the voltage is adjustable, the DC gain of the converter 100 may be not enough, or it is required to lower the switching frequency f significantly to increase the gain. In some embodiments of the present disclosure, the converter 100 may, by adjusting the inductance value of the variable inductor, reduce the inductance value ratio h of the resonant inductance unit 144 and the magnetic inductance unit 146 in order to obtain a higher output voltage Vo.

In the following paragraphs, various embodiments of the arrangement of the variable inductor will be discussed in accompany with drawings correspondingly. Reference is made to FIG. 5A-FIG. 5D. FIG. 5A-FIG. 5D are diagrams illustrating the resonant circuit 140 according to some embodiments of the present disclosure.

In the embodiments shown in FIG. 5A-FIG. 5D, the inductance value ratio h of the resonant inductance unit 144 and the magnetic inductance unit 146 may be adjusted by arranging the variable inductor Lm in the magnetic inductance unit 146. As shown in FIG. 5A, in some embodiments, the resonant inductance unit 144 may include a fixed inductor Ls, and the magnetic inductance unit 146 may include a variable inductor Lm. For example, in some embodiments, the variable inductor Lm may include a magnetic powder core inductor, such as Molybdenum Permalloy Powder (MPP) cores, High Flux Cores having Fe—Ni alloy Powder, Kool Mu/Sendust Cores, Mega Flux Cores having Fe—Si alloy Powder, etc. but the present disclosure is not limited thereto.

For the variable inductor Lm adopting the magnetic powder core mentioned above, a permeability of the magnetic powder core inductor varies as an intensity of dc bias magnetic field varies. Therefore, the inductance value changes according to the current flowing through, and the change rates are different for different magnetic powder cores.

As shown in FIG. 5B and FIG. 5C, in some embodiments, the magnetic inductance unit 146 may include a fixed inductor Lm1 and a variable inductor Lm2 electrically coupled to each other, such that the overall inductance of the magnetic inductance unit 146 is variable. As shown in FIG. 5B, the fixed inductor Lm1 and the variable inductor Lm2 in the magnetic inductance unit 146 are electrically coupled in series. As shown in FIG. 5C, the fixed inductor Lm1 and the variable inductor Lm2 in the magnetic inductance unit 146 are electrically coupled in parallel. It is noted that, the fixed inductor Lm1 merely indicates that within the load variation region, the inductance value is fixed. The inductors which can be fixed within the operating region of the load variation may be considered as fixed inductors.

For example, in the embodiments shown in FIG. 5B and FIG. 5C, the fixed inductor Lm1 may be a Gapped Ferrite Core inductor. Alternatively stated, the material of the magnetic core applied in the fixed inductor Lm1 may be different from the material of the magnetic core applied in the variable inductor Lm2. Compared to FIG. 5A, in the embodiments shown in FIG. 5B and FIG. 5C, the change rate of the overall magnetic inductance may be adjusted according to the ratio of the fixed inductor Lm1 and the variable inductor Lm2. For example, in FIG. 5B, if a greater change of the magnetic inductance is desired, the portion of the variable inductor Lm2 may be increased; if a little change of the magnetic inductance is desired, the portion of the variable inductor Lm2 may be decreased, so as to enhance the circuit.

As shown in FIG. 5D, in some embodiments, the variable inductor Lm2 in the magnetic inductance unit 146 may also be a saturable magnetic core inductor. By changing the current flowing through the saturable magnetic core inductor, the inductance value of the saturable magnetic core inductor may be changed correspondingly. Thus, the resonant circuit 140 may be configured to change the inductance value ratio h of the resonant inductance unit 144 and the magnetic inductance unit 146 by the magnetic saturation characteristics of the saturable magnetic core.

Reference is made to FIG. 6A-FIG. 6D. FIG. 6A-FIG. 6D are diagrams illustrating the resonant circuit 140 according to some other embodiments of the present disclosure. Compared to the embodiments shown in FIG. 5A-FIG. 5D, in the embodiments shown in FIG. 6A-FIG. 6D, the variable inductors Ls or Ls2 are arranged in the resonant inductance unit 144 in order to adjust the inductance value ratio h of the resonant inductance unit 144 and the magnetic inductance unit 146. In addition, since the resonant frequency $f_s$ and the quality factor Q of the converter 100 are related to the inductance value of the resonant inductance unit 144, the resonant frequency $f_s$ and the quality factor Q of the converter 100 may also be adjusted by the variable inductors Ls or Ls2 arranged in the resonant inductance unit 144. For example, if the load condition is at a light load, the current flowing through the resonant inductance unit 144 is small, and the variable inductors Ls or Ls2 has a large inductance value, such that a large quality factor Q and a small inductance value ratio h are obtained in the converter 100, which may assist to control the output voltage Vo at the proper voltage level.

As shown in FIG. 6A, in some embodiments, the magnetic inductance unit 146 may include a fixed inductor Lm, and the resonant inductance unit 144 may include a variable inductor Ls. Similarly, in some embodiments, the variable inductor Ls in the resonant inductance unit 144 may include various types of magnetic powder core inductors, which are discussed in detail in the above paragraphs and thus are omitted herein for the sake of brevity.

As shown in FIG. 6B and FIG. 6C, in some embodiments, the resonant inductance unit 144 may include a fixed inductor Ls1 and a variable inductor Ls2 electrically coupled to each other, such that the overall inductance of the resonant inductance unit 144 is variable. As shown in FIG. 6B, the fixed inductor Ls1 and the variable inductor Ls2 in the resonant inductance unit 144 are electrically coupled in series. As shown in FIG. 6C, the fixed inductor Ls1 and the variable inductor Ls2 in the resonant inductance unit 144 are electrically coupled in parallel. Similarly, the fixed inductor Ls1 may be a Gapped Ferrite Core inductor. Alternatively stated, the material of the magnetic core applied in the fixed inductor Ls1 may be different from the material of the magnetic core applied in the variable inductor Ls2, and the portion of the fixed inductor Ls1 and of the variable inductor Ls2 may be adjusted, which is similar to the discussion in the above paragraphs and thus are omitted herein for the sake of brevity.

As shown in FIG. 6D, in some embodiments, the variable inductor Ls2 in the resonant inductance unit 144 may also be a saturable magnetic core inductor. By changing the current flowing through the saturable magnetic core inductor, the inductance value of the saturable magnetic core inductor may be changed correspondingly. Thus, the resonant circuit 140 may be configured to change the inductance value ratio h of the resonant inductance unit 144 and the magnetic inductance unit 146 by the magnetic saturation characteristic of the saturable magnetic core.

It is noted that, the magnetic inductance unit 146 depicted in FIGS. 5A-5D and the resonant inductance unit 144 depicted in FIGS. 6A-6D may be combined with each other as long as no contradiction appears. The circuits illustrated in the drawings are merely examples and simplified for the simplicity and the ease of understanding, but not meant to be limited to the present disclosure.

Figure 7:
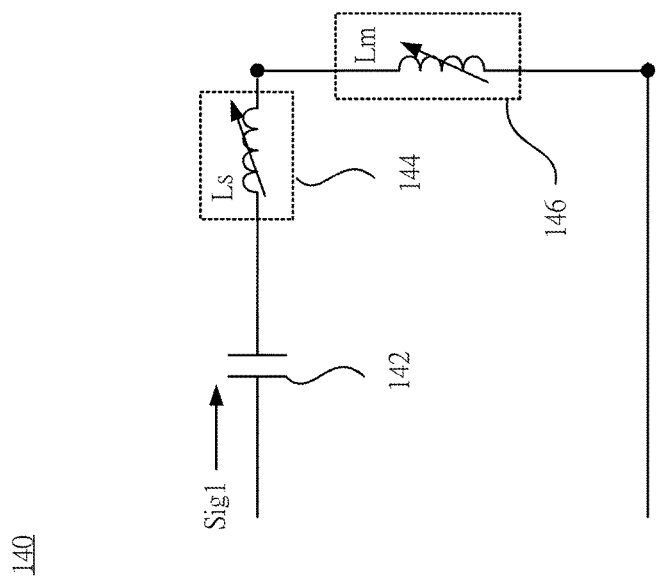
FIG. 7 is a diagram illustrating the resonant circuit according to some other embodiments of the present disclosure.

Alternatively stated, as depicted in FIG. 7, in some embodiments, the resonant inductance unit 144, the magnetic inductance unit 146 may respectively include the variable inductor Ls and the variable inductor Lm, or the fixed inductor Ls1 and the variable inductor Ls2 electrically coupled in series or in parallel, and the fixed inductor Lm1 and the variable inductor Lm2 electrically coupled in series or in parallel. It is noted that on the condition that the resonant inductance unit 144 and the magnetic inductance unit 146 respectively includes the variable inductor Ls and the variable inductor Lm, the variable inductor Ls and the variable inductor Lm may be configured to have different change rates to meet the requirements of various applications, in which the applied magnetic core materials and related operations are discussed in detail in the above embodiments and thus are omitted herein.

In summary, by arranging the variable inductor in the resonant inductance unit and/or the magnetic inductance unit in the resonant circuit in various embodiments above, the inductance value ratio of the resonant inductance unit and the magnetic inductance unit may be automatically adjusted at a proper ratio based on the load condition, so as to obtain different output characteristic curves of the converter. In addition, in some embodiments, the resonant frequency and the quality factor of the converter may also be adjusted accordingly, to obtain different output characteristic curves of the converter.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A converter comprising:
   a switching circuit configured to convert a dc input voltage to a switching signal;
   a resonant circuit electrically coupled to the switching circuit and configured to receive the switching signal to provide a primary current;
   a transformer comprising:
   a primary winding electrically coupled to the resonant circuit; and
   a secondary winding;
   a rectifying circuit electrically coupled to the secondary winding and configured to rectify a secondary current outputted by the secondary winding so as to provide an output voltage; and
   wherein the resonant circuit comprises:
   a resonant capacitance unit electrically coupled to the primary winding in series;
   a resonant inductance unit electrically coupled to the primary winding in series; and
   a magnetic inductance unit electrically coupled to the primary winding in parallel, wherein the magnetic inductance unit comprises a variable inductor to adjust a characteristic curve of the converter, and a fixed inductor electrically coupled to the variable inductor in series or in parallel, wherein a magnetic core material in the fixed inductor is different from a magnetic core material in the variable inductor.

2. The converter of claim 1, wherein the converter is configured to adjust an inductance value of the variable inductor to control a dc gain of the converter.

3. The converter of claim 1, wherein the resonant circuit is configured to adjust an inductance ratio between the resonant inductance unit and the magnetic inductance unit by the variable inductor.

4. The converter of claim 1, wherein the fixed inductor comprises a Gapped Ferrite Core inductor.

5. The converter of claim 1, wherein the variable inductor comprises a magnetic powder core inductor, and the permeability of the magnetic powder core inductor varies as an intensity of dc bias magnetic field varies.

6. The converter of claim 1, wherein the variable inductor comprises a saturable magnetic core inductor.

7. The converter of claim 1, wherein the switching circuit comprises:
- a first switch, wherein a first terminal of the first switch is electrically coupled to a positive terminal of the dc input voltage, and a second terminal of the first switch is electrically coupled to the resonant circuit; and
- a second switch, wherein a first terminal of the second switch is electrically coupled to the second terminal of the first switch, and a second terminal of the second switch is electrically coupled to a negative terminal of the dc input voltage.

8. The converter of claim 1, wherein the secondary winding in the transformer comprises a first secondary winding and a second secondary winding, and a start point of the second secondary winding is electrically coupled to an end point of the first secondary winding.

9. The converter of claim 8, wherein the rectifying circuit comprises:
- a first diode, wherein an anode of the first diode is electrically coupled to a start point of the first secondary winding, and a cathode of the first diode is electrically coupled to a positive terminal of an output capacitor;
- a second diode, wherein an anode of the second diode is electrically coupled to an end point of the second secondary winding, and a cathode of the second diode is electrically coupled to the cathode of the first diode; and wherein the end point of the first secondary winding and the start point of the second secondary winding are electrically coupled to a negative terminal of the output capacitor.

10. A converter comprising:
- a switching circuit configured to convert a dc input voltage to a switching signal;
- a resonant circuit electrically coupled to the switching circuit and configured to receive the switching signal to provide a primary current;
- a transformer comprising:
  - a primary winding electrically coupled to the resonant circuit; and
  - a secondary winding;
- a rectifying circuit electrically coupled to the secondary winding and configured to rectify a secondary current outputted by the secondary winding so as to provide an output voltage; and
- wherein the resonant circuit comprises:
  - a resonant capacitance unit electrically coupled to the primary winding in series;
  - a resonant inductance unit electrically coupled to the primary winding in series, wherein the resonant inductance unit comprises a variable inductor to adjust a characteristic curve of the converter, and the resonant circuit is configured to adjust a quality factor of the converter by the variable inductor; and
  - a magnetic inductance unit electrically coupled to the primary winding in parallel.

11. The converter of claim 10, wherein the resonant inductance unit further comprises a fixed inductor electrically coupled to the variable inductor in series or in parallel, and a magnetic core material in the fixed inductor is different from a magnetic core material in the variable inductor.

12. The converter of claim 11, wherein the fixed inductor comprises a Gapped Ferrite Core inductor.

13. The converter of claim 10, wherein the converter is configured to adjust an inductance value of the variable inductor to control a dc gain of the converter.

14. The converter of claim 10, wherein the variable inductor comprises a magnetic powder core inductor, and the permeability of the magnetic powder core inductor varies as an intensity of dc bias magnetic field varies.

* * * * *